US005659418A

United States Patent [19]
Yurke

[11] Patent Number: 5,659,418
[45] Date of Patent: Aug. 19, 1997

[54] STRUCTURE FOR MEMBRANE DAMPING IN A MICROMECHANICAL MODULATOR

[75] Inventor: Bernard Yurke, Plainfield, N.J.

[73] Assignee: Lucent Technologies Inc., Murray Hill, N.J.

[21] Appl. No.: 597,003

[22] Filed: Feb. 5, 1996

[51] Int. Cl.⁶ .................................. G02B 26/00
[52] U.S. Cl. .............. 359/290; 359/291; 359/295; 250/227.23
[58] Field of Search .................... 359/290, 291, 359/294, 295, 298; 250/227.23, 227.27

[56] References Cited

U.S. PATENT DOCUMENTS

| | | | |
|---|---|---|---|
| 3,463,572 | 8/1969 | Preston, Jr. | 359/295 |
| 3,479,109 | 11/1969 | Preston, Jr. | 359/295 |
| 3,701,586 | 10/1972 | Goetz | 359/295 |
| 3,796,480 | 3/1974 | Preston, Jr. et al. | 359/295 |
| 3,985,952 | 10/1976 | Adler | 359/290 |
| 4,805,038 | 2/1989 | Seligson | 359/290 |
| 5,280,173 | 1/1994 | Morse et al. | 250/227.23 |
| 5,500,761 | 3/1996 | Goossen et al. | 359/290 |
| 5,526,172 | 6/1996 | Kanack | 359/291 |

Primary Examiner—Loha Ben

[57] ABSTRACT

An improved micromechanical modulator that incorporates a mechanical transmission line for damping membrane vibration is disclosed. The modulator comprises a transmission line mechanically communicating with a vertically-movable membrane for receiving an optical signal. The membrane is supported over a substrate. Under the action of bias, the membrane moves toward the substrate, which causes a change in an optical property of the modulator. The transmission line receives and dissipates a sufficient amount of the energy developed in the membrane as it moves to prevent the membrane from vibrating. In one configuration, the modulator incorporates two strip-line transmission lines. In another configuration, the modulator incorporates two clamped-plate transmission lines.

22 Claims, 6 Drawing Sheets

STRUCTURE FOR MEMBRANE DAMPING IN A MICROMECHANICAL MODULATOR

FIELD OF THE INVENTION

The present invention relates to a structure useful for damping membrane vibration in micromechanical optical modulators. More particularly, the present invention relates to using mechanical transmission lines for damping membrane vibration in micromechanical optical modulators.

CROSS REFERENCE TO RELATED APPLICATIONS

This application is related to co-pending U.S. patent applications SER. NO. 08/187,676 filed Jan. 27, 1994, now U.S. Pat. No. 5,500,761, Ser. No. 08/283,106 filed Jul. 29, 1994, Ser. No. 08/578,590 filed Jun. 7, 1995, Ser. No. 08/479,476 filed Jun. 7, 1995, now U.S. Pat. No. 5,589,974, Ser. No. 08/578,123 filed Dec. 26, 1995 (Docket No.: Goossen 39, "Phase-Mismatched Fabry-Perot Cavity Micromechanical Modulator", inventor: K. W. Goossen), and Ser. No. 08/565,453 filed Feb. 1, 1996 (Docket No.: Arney 2-1-27-5, "Method and Apparatus for an Improved Micromechanical Modulator", Inventors: S. Arney, D. Greywall, J. Walker and B. Yurke).

BACKGROUND OF THE INVENTION

It is desirable in optical wavelength-division-multiplexing networks to have inexpensive optical modulators that have high contrast and wide optical bandwidths. One potentially suitable optical modulator is the surface-normal micromechanical optical modulator. This device has a variable air gap defined by two layers of material, one of which is vertically-movable. The movable layer is usually embodied as a membrane, the other layer is typically a substrate.

Such modulators typically have two states; an "on state" and an "off state." In the on state, a voltage is applied across the membrane and substrate generating an electrostatic force that causes the membrane to move towards the substrate. In the off state, voltage is not applied, and the membrane is quiescent. The change in membrane position relative to the substrate alters the optical properties of the device, which can be utilized to modulate an optical signal. In particular, in one of either the on state or the off state, a minimal portion of the optical energy incident upon the modulator is returned in the surface normal direction. In the other state, a significantly greater portion of the incident optical energy is so directed. Thus, the optical signal is modulated by the difference in optical energy returned in the surface normal direction in the two states.

In the absence of sufficient damping, the modulator membrane tends to ting or vibrate after moving from one state, i.e., position, to the other. Since the optical properties of the aforementioned modulators change with changes in membrane position, such ringing will affect modulator performance. In fact, the operating bit rate or frequency of such micromechanical modulators may be limited by the membrane's tendency to vibrate.

Typical prior art modulators exploit the gas, usually air, that is within the modulator cavity to provide damping. In particular, the shear flow that is generated in the air as the membrane moves dissipates the kinetic energy of the membrane, hence providing damping. At frequencies above about 1 MHz, however, this dissipation mechanism becomes ineffective because the air does not have time to flow. Rather, the air is compressed as the membrane moves downwardly, and stores energy like a spring.

As such, there is a need for a micromechanical modulator adapted to damp membrane vibrations that may occur, for example, when operating at frequencies above 1 MHz.

SUMMARY OF THE INVENTION

An improved micromechanical modulator that incorporates a mechanical transmission line for damping membrane vibration is disclosed. Such a transmission line may be incorporated into a wide variety of micromechanical modulators. Typically, such modulators comprise a vertically-movable membrane for receiving an optical signal supported over a substrate. In one embodiment, the mechanical transmission line is configured as two strip-lines. One end of each transmission line is attached to either side of the membrane such that the arrangement has the form of an elongated "plus" sign. The other end of each transmission line overlaps a support layer so that the transmission lines are suspended, over their length, above the substrate. If the transmission lines are sufficiently long, low mass, low tension support arms may be used to provide intermediate support to prevent the transmission lines from contacting the substrate. As the membrane moves from the unbiased position to the biased position, or vice-versa, energy is radiated into the transmission lines. The energy propagates along the transmission lines away from the membrane and is dissipated to a surrounding gas, such as air.

In a second embodiment, the mechanical transmission line is configured as two clamped plates, one on either side of the membrane. In this embodiment, the membrane and transmission line form a substantially continuous surface that is supported over the substrate via a support layer. Holes are present in the transmission lines to allow the gas in the cavity underneath the membrane and transmission lines to flow and so dissipate energy from the transmission lines.

BRIEF DESCRIPTION OF THE DRAWINGS

Further features of the invention will become more apparent from the following detailed description of specific embodiments thereof when read in conjunction with the accompanying drawings, in which like elements have like reference numerals and in which.

DETAILED DESCRIPTION OF THE PREFERRED EMBODIMENT

Figure 1:
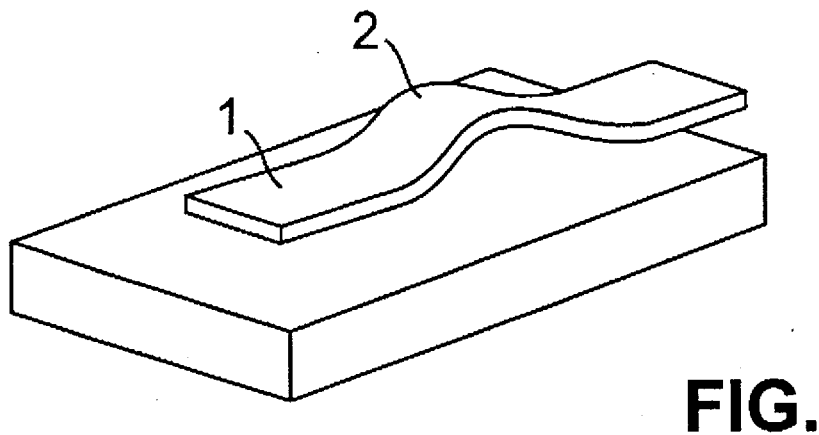
FIG. 1 is an illustration of a strip-line transmission line.

FIG. 1 is an illustration of a "strip-line" transmission line 1. A movable mass, not pictured, may be connected to one end of the transmission line 1. If set in motion, the mass develops kinetic energy. Such kinetic energy may be radiated to the transmission line 1, resulting in a pulse 2, which propagates along the transmission line 1. If the transmission line 1 is sufficiently long, the energy radiated to it can be lost to the surrounding medium, such as air or other gases, before it returns to the moving mass. According to the present invention, a mechanical transmission line is incorporated into a micromechanical modulator to radiate energy away from the membrane of the modulator, preventing the membrane from ringing. Such ringing can be prevented even at modulator operating frequencies above 1 MHz.

The present invention is applicable to a wide variety of micromechanical modulators. While such modulators may vary in terms of operating principles and structural details, they have a number of common attributes. In particular, such modulators typically have two spaced layers, at least one of which is movable, usually in a vertical direction either toward or away from the other layer. A controlled voltage source may be used to apply a voltage across the two layers, generating an electrostatic force that causes the movable layer to move towards the other layer. As the movable layer moves, there is usually a change in an optical property of the modulator. Such a change may be exploited to alter a measureable characteristic of an optical signal. For example, the reflectivity of the modulator may change as the layer moves, resulting in a change in the measured amplitude of the optical signal leaving the modulator in the surface normal direction. The change in reflectivity may be used to modulate an optical signal. Specific embodiments of the present invention are described below.

Figure 2:
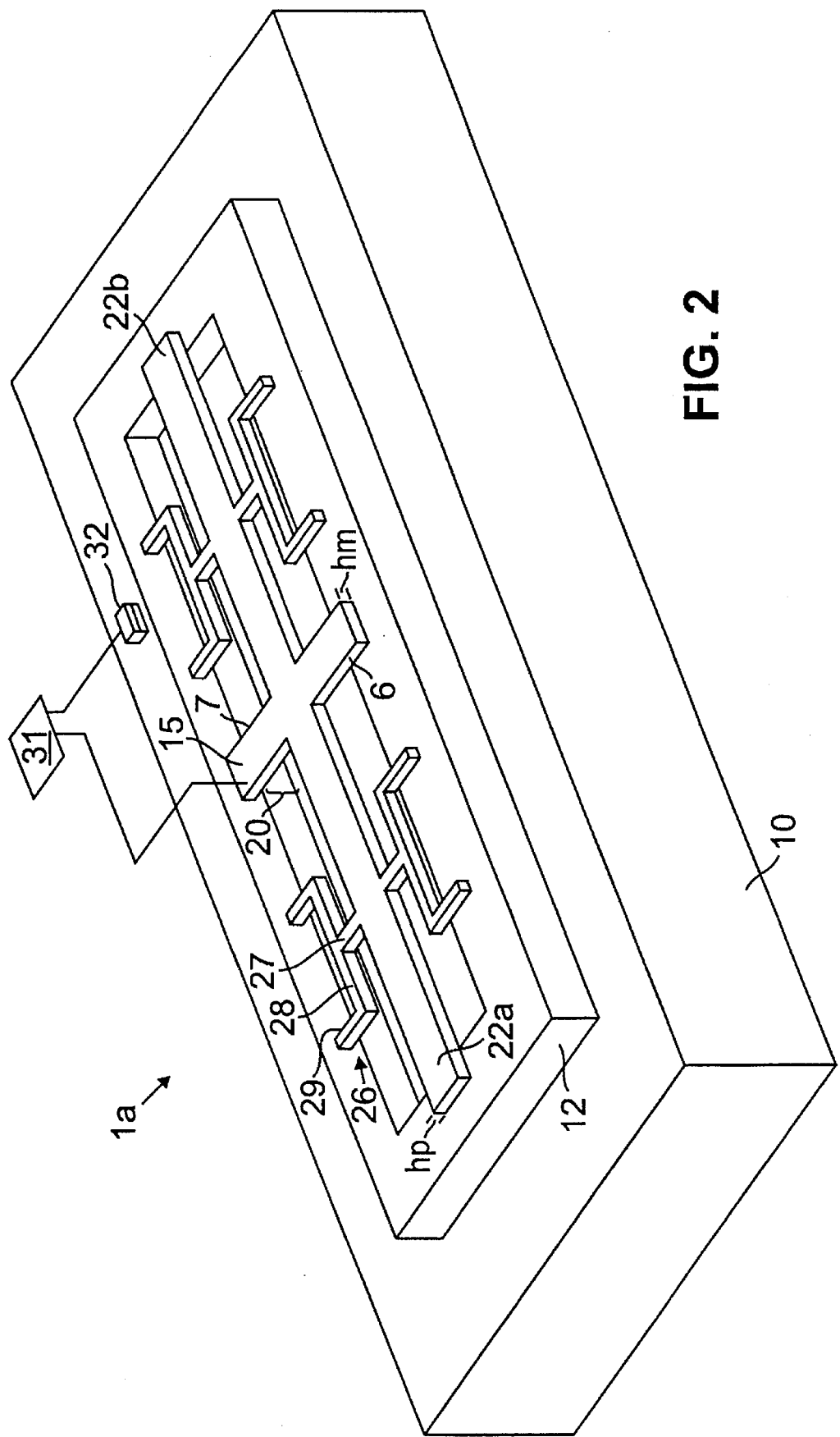
FIG. 2 is a perspective view of an embodiment of a micromechanical modulator incorporating two strip-line transmission lines according to the present invention.

In a first embodiment of the invention, illustrated in FIG. 2, two strip-line transmission lines 22a and 22b are incorporated in a micromechanical modulator 1a. The modulator 1a also includes an optical-signal-receiving membrane 15 and a substrate 10. The membrane 15 is supported above the substrate 10 by a support layer 12. A gap 20 exists between the membrane 15 and the substrate 10.

As depicted in FIG. 2, the transmissions lines 22a and 22b extend outwardly from sides 6 and 7 of the membrane 15, respectively. The arrangement has the shape of an elongated "plus" sign since the transmission lines 22a and 22b will usually be longer than the membrane 15.

The modulator 1a further includes optional support arms 26 for supporting the transmission lines 22a and 22b. Such support arms 26 are not required unless, in their absence, the transmission lines 22a and 22b sag, due to their length, to the extent that they contact the underlying substrate 10. The support arms, if present, are located at intermediate positions along the transmission lines 22a and 22b. While two support arms are shown supporting each transmission line, more support arms may be required in other embodiments. The mass of, and tension in, the support arms 26 should be as low as possible to minimize the amount of energy reflected back to the membrane 15 by the support arms. In the arrangement shown in FIG. 2, the support arms 26, consisting of members 27–29, have a "Y" configuration. Such a configuration should minimize tension. In particular, the member 28 will flex relieving tension in the support arm. Other arrangements for achieving the same result will occur to those skilled in the art.

The substrate 10 and the membrane 15 are preferably suitably conductive so that a biasing signal may be applied across them generating an electrostatic force. This force causes the membrane 15 to move toward the substrate. As the membrane 15 moves from its unbiased position, the reflectivity of the modulator 1a to an incident optical signal changes. The biasing signal can be supplied by a controlled voltage source 31. A contact 32 may be formed on the substrate 10 to facilitate electrical connection with the controlled voltage source. The controlled voltage source is also electrically connected to the membrane 15.

If the membrane is not suitably conductive for a modulator according to the present invention, a layer of conductive material, not shown, may be deposited on it. If such conductive material is optically opaque at the operating wavelengths of the modulator, it should not be deposited in a central region of the membrane 15, referred to as the optical window. Thus, an optical signal to be modulated is directed toward the optical window in the membrane 15.

The operation of such a modulator, its structure and methods for fabrication are described in detail in co-pending U.S. patent applications Ser. No. 08/187,676 filed Jan. 27, 1994, Ser. No. 08/283,106 filed Jul. 29, 1994, Ser. No. 08/578,590 filed Jun. 7, 1995 and Ser. No. 08/479,476 filed Jun. 7, 1995. The aforementioned specifications do not describe the fabrication of transmission lines. Such transmission lines 22a and 22b are preferably patterned from the same layer of material that is used to form the membrane 15. It will be appreciated that an appropriately configured mask will be required for suitably patterning the transmission lines of the modulator 1a described herein. The requisite modifications to the referenced teachings are within the capabilities of those skilled in the art. Note that the specifications of the aforementioned applications describe a modulator having an optical-signal-receiving membrane that is supported by support arms, unlike the membrane 15 illustrated in FIG. 2, which simply overlaps the support layer 12. A modulator having such an overlapping membrane is described in Ser. No. 08,565,453 (Docket No.: Arney 2-1-27-5, "Method and Apparatus for an Improved Micromechanical Modulator", inventors: S. Arney, D. Greywall, J. Walker and B. Yurke, filed Feb. 1, 1996). All of the above-referenced patent applications describe modulators that are based on a membrane comprising at least one quarter-wave thick layer of material, preferably silicon nitride, having a refractive index that is approximately equal to the square root of the refractive index of the substrate, preferably silicon. The aforementioned applications, as well as any other patents, patent applications, articles or other references mentioned in this specification are incorporated by reference herein.

It should be understood that the present invention can be used in conjunction with other types of modulators, as well. For example, the present invention can be utilized in conjunction with the phase-mismatched modulator described in Ser. No. 08/578,123, (Docket No.: Goossen 39, "Phase-Mismatched Fabry-Perot Cavity Micromechanical Modulator", inventor: K. W. Goossen, fled Dec. 26, 1995).

According to the present invention, the transmission line, such as transmission lines 22a and 22b, removes sufficient energy from the membrane 15 to prevent it from ringing, and, preferably, such energy is removed in one-quarter cycle or less at the operating frequency of the modulator. The quality factor, Q, is proportional to the ratio of the energy stored in a resonator, such as the membrane 15, to the energy lost during the cycle. Thus, Q must be equal to one or less to ensure that the energy stored in the membrane is lost in one cycle. As Q approaches zero, however, the modulator will be too sluggish. A preferred range for Q is about 0.5 to about 1.0. In a presently preferred embodiment, Q ranges from about 0.7 to about 0.8. Having a range of acceptable values for Q, the required configuration for the transmission line can be determined as follows.

Figure 3:
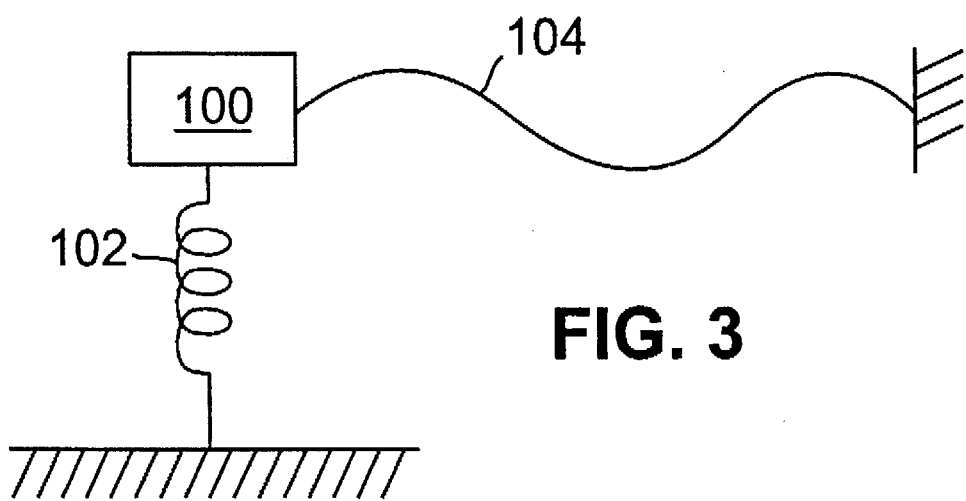
FIG. 3 is a diagram showing a movable mass attached to a string and spring.

The configuration of the modulator 1a, wherein the membrane 15 is connected to transmissions lines 22a and 22b, can be modelled as the system shown in FIG. 3, but with only one transmission line. As shown in FIG. 3, a mass 100 having a mass of M, is connected to a spring 102 having a spring constant, K, and is also connected to a first end of string 104. The second end of string 104 is fixed. The quiescent string 104 is taken to lie along the x-axis of a coordinate system. The mass 100 and spring 102 are located at x=0. The height of the string 104 is denoted by Y. Note that Y is a function of x, and, at x=0, Y is the displacement of the mass 100.

The wave equation for the string is given by:

$$m[\partial^2 Y/\partial t^2] - \sigma[\partial^2 Y/\partial x^2] = 0 \quad [1]$$

where: m is the mass per unit length of the string, σ is the tension of the string, i.e., force along the direction of the string, t is time and x is the position along the string.

The equation of motion for the spring 102 and mass 100 is given by:

$$M[d^2Y/dt^2] + KY = \sigma[\partial Y/\partial x]_{x=0+} \quad [2]$$

The general solution to [1] is given by:

$$Y = Y_{in}(x+vt) + Y_{out}(x-vt) \quad [3]$$

where: v is the propagation velocity, which is given by:

$$v = (\sigma/m)^{0.5} \quad [4]$$

where: $Y_{in}$ are those displacements of the string that move toward the mass 100 and $Y_{out}$ are those displacements of the string that move away from the mass 100.

The following expressions are obtained from [3]:

$$\partial Y/\partial t = \partial Y_{in}/\partial t + \partial Y_{out}/\partial t \quad [5]$$

$$\partial Y/\partial x = 1/v[\partial Y_{in}/\partial t] - 1/v \lambda \partial Y_{out}/\partial t \quad [6]$$

Eliminating $\partial Y_{out}/\partial t$ from these equations yields:

$$\partial Y/\partial x = 2/v[\partial Y_{in}/\partial t] - 1/v[\partial Y/\partial t] \quad [7]$$

Substituting [7] into [2] yields:

$$M[d^2y/dt^2] + \Gamma[dY/dt] + KY = 2\Gamma[dY_{in}/dt] \quad [8]$$

where: Γ is the mechanical impedance, which is given by:

$$\Gamma = \sigma/v = (m\sigma)^{0.5} \quad [9]$$

The term Γ[dY/dt] in [8] is the damping force exerted by the string 104 on the mass 100 as energy is radiated into the string.

If the transmission line is lossy and sufficiently long so that $Y_{in} = 0$, then $$M[d^2y/dt^2] + \Gamma[dY/dt] + KY = 0 \quad [10]$$

where [10] is the equation of motion of a damped resonator.
The quality factor, Q, already discussed, is given by:

$$Q = \omega_o M/\Gamma \quad [11]$$

where: $\omega_o$ is the angular frequency of the resonator, which is given by:

$$\omega_o = (K/M)^{0.5} = 2\pi f_o \quad [12]$$

where: $f_o$ is the resonant frequency of the resonator, in Hertz.

Figure 4:
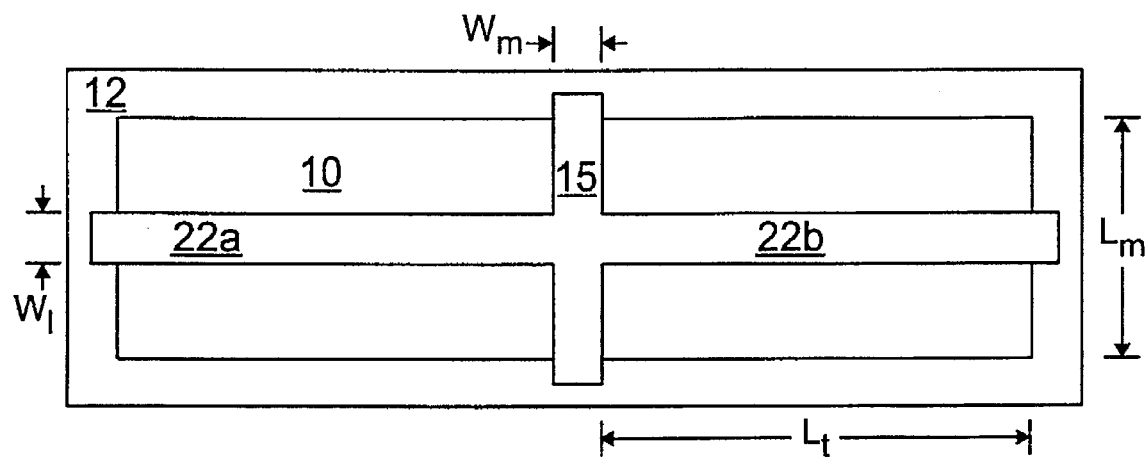
FIG. 4 is a schematic of the transmission lines and membrane of the modulator of FIG. 2.

The above expressions can now be applied to the modulator 1a illustrated in FIG. 2, which is shown in a more basic plan view in FIG. 4. In the modulator 1a, the width, $W_m$, of the optical-signal-receiving membrane 15 is the same as the width, $W_1$ of the transmission lines 22a and 22b. The membrane 15 is further characterized by a length, $L_m$. Utilizing the foregoing expressions, as illustrated below, the quality factor for the modulator 1a is 0.5, which is within the range characterized as acceptable. The quality factor is determined as follows.

As previously noted, the mechanical impedance, Γ, of a transmission line is given by [9]. In the case of the modulator 1a, the mechanical impedance, Γ, is the sum of the mechanical impedance of the transmission lines 22a and 22b. The mechanical impedance of each of such transmission lines will be denoted as follows: $\Gamma_1 = (m_1 \sigma_1)^{0.5}$, so that $\Gamma = 2\Gamma_1$, where $m_1$ is the mass per unit length of the transmission lines 22a and 22b, and $\sigma_1$ is the tension in the transmission lines 22a and 22b. Thus, $m_1$ may be expressed as: $h_1 W_1 \rho_1$, where: $h_1$ is the thickness of the transmission line and $\rho_1$ is the density of the transmission line. Likewise, $\sigma_1$ may be expressed as: $h_1 W_1 T_1$, where: $T_1$ is the tension expressed as a force per unit cross-sectional area in the transmission line. The mechanical impedance, Γ, in [10] may therefore be expressed as:

$$\Gamma = 2\Gamma_1 = 2h_1 W_1 (\rho_1 T_1)^{0.5}$$

As previously described, $Q = \omega_o M/\Gamma$, where: $\omega_o = (K/M)^{0.5}$. M may be expressed as $m_m L_m$ or $h_m W_m \rho_m L_m$, where: $m_m$ is the mass per unit length of the membrane and $\rho_m$ is the density of the membrane. K, the spring constant, is a force per unit length. Thus, K may be expressed as $\rho_m/L_m$ or $h_m W_m T_m/L_m$. Therefore, $\omega_o = 1/L_m(T_m \rho_m)^{0.5}$.

For the modulator 1a, $h_1 = h_m$, $W_1 = W_m$, $\rho_1 = \rho_m$ and $T_1 = T_m$. Utilizing these equalities, and substituting the expressions for $\omega_o$, M and Γ into expression [11], Q=½.

In the modulator 1a, the transmission lines and the membrane have the same width, thickness, and density. In other embodiments, however, these characteristics may vary as between the transmission lines and the membrane. The above expressions are suitable for designing modulators incorporating strip-line transmission lines where the characteristics of the transmission lines are different from those of the membrane.

The length, $L_l$, of a strip-line transmission line, such as transmission lines 22a and 22b, can be determined as follows. A mechanical pulse, i.e., vibration, on the membrane 15 travels a distance $2L_m$ in one cycle. As this pulse travels along a strip-line transmission line, such as transmission lines 22a or 22b, the energy will be radiated to the surrounding medium. The energy present in the transmission line after the pulse travels a distance, x, along the transmission line is given by:

$$E = E_o \exp(-x[\pi/Q_u L_m]) \quad [13]$$

where: $E_o$ is the initial energy delivered to the transmission line and $Q_u$ is the quality factor of a membrane 15 without transmission lines attached, hereinafter, an "unloaded" membrane. The quality factor, $Q_u$, will be described in more detail below.

For a transmission line, such as the transmission lines 22a and 22b, having a length $L_l$, the distance traveled by the energy before it returns to the membrane 15 is $2L_l$. Thus, the fraction of the initial energy returned to the membrane 15 is given by:

$$\exp(-2L_t[\pi/Q_uL_m]) \quad [14]$$

The energy returned to the membrane 15 should be less than about 5 percent, and preferably less than about 1 percent, of the initial energy. Thus, the length, $L_t$, of a transmission line, such as the transmission lines 22a and 22b, may be calculated by selecting a value for [14] and solving for $L_t$. For example, if the energy returned to the membrane is to be reduced to $e^{-5}$ or 0.67 percent of the initial energy, then $L_t = 5 Q_u L_m/(2\pi)$.

The quality factor, $Q_u$, may be expressed as $Q_u = 2\pi$ (Energy stored in the membrane/energy lost per cycle). The quality factor may be determined by applying a voltage to an unloaded modulator, examining the optical signal and determining how long the membrane takes to settle from the time record. Such a method is within the capabilities of those skilled in the art. Alternatively, $Q_u$ can be directly calculated according to the following expression:

$$Q_u = f^2[(8\pi^2 \rho g)/(PF(X)X)] \quad [15]$$

where: $\rho$ is the mass per unit area of the membrane, g is the distance between the membrane and the substrate, P is the pressure of the gas through which the membrane moves and f the resonant frequency of the membrane. X is given by:

$$X = W_m/(2\lambda_p) \quad [16]$$

where: $W_m$ is the width of the membrane and $\lambda_p$ is given by:

$$\lambda_p = [(Pg^2)/(12\pi\mu_{eff} f)]^{0.5} \quad [17]$$

where: $\mu_{eff}$ is the effective gas viscosity. The effective gas viscosity may be expressed in terms of gas viscosity $\mu$ by the formula:

$$\mu_{eff} = \mu/\{1 + [6(2-\sigma)\lambda/(\lambda g)]\} \quad [18]$$

where: $\sigma$ is the accomodation coefficient, and $\lambda$ is the mean-flee-path of the gas. The accomodation coefficient is a measure of how effectively a surface scatters gas molecules that impinge the surface. Typically, $\sigma$ has a value near 1.

The function F(X) is given by:

$$F(X) = [\cos h\, X \sin hX - \cos X \sin X]/[\sin h^2 X + \cos h^2 X \cos^2 X] \quad [19]$$

The following example illustrates using [15]–[19] to determine $Q_u$. In this example, the gas surrounding the membrane is air at a temperature of 20° C. and a pressure of one atmosphere. Furthermore, the membrane is designed for a frequency of 2 MHz and the spacing between the membrane and substrate is one micron. Additionally, the membrane is assumed to be 20 microns wide and have a mass per unit area of $1.2 \times 10^{-4}$ grams per square centimeter. The accomodation coefficient, $\lambda$, is assumed to be equal to 1, $\lambda = 0.09$ microns, and $\mu = 1.8 \times 10^{-4}$ grams per centimeter second. Substituting the appropriate values into [18] gives $\mu_{eff} = 1.2 \times 10^{-4}$ grams per centimeter second, into [17] gives $\lambda_p = 10$ microns and into [16] gives X=1.0. Substituting X=1.0 into [19] gives F(X)=0.81. Substituting the appropriate values into [15] gives $Q_u = 4.7$.

If a strip-line transmission line is added to the membrane of the previous example, the length, $L_t$, of such a transmission line is given by: $L_t = 5Q_uL_m/(2\pi)$ where the energy returned to the membrane is to be reduced to $e^{-5}$ or 0.67 percent of the initial energy, as previously described. Substituting the value for $Q_u$ into the foregoing expression yields: $L_t = 3.74L_m$. Thus, for the foregoing example, the transmission line should be approximately three and three-quarters times as long as the membrane. It should be understood that in other embodiments, the transmission line can be designed to return more or less energy to the membrane, and will accordingly be shorter or longer than $3.74L_m$.

The length, $L_m$, of the membrane 15 can be determined as a function of desired operating frequency using the methods described later in this specification. While the specific dimensions of a membrane, such as the membrane 15, may vary with variations in modulator designs and with the specifics of the intended application, the length, $L_m$, and the width, $W_m$, of the membrane 15 will typically be in the range of 20 to 200 microns.

Figure 5:
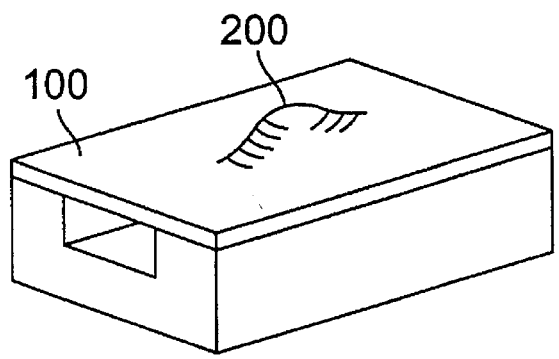
FIG. 5 is an illustration of a clamped-plate transmission line.
Figure 6:
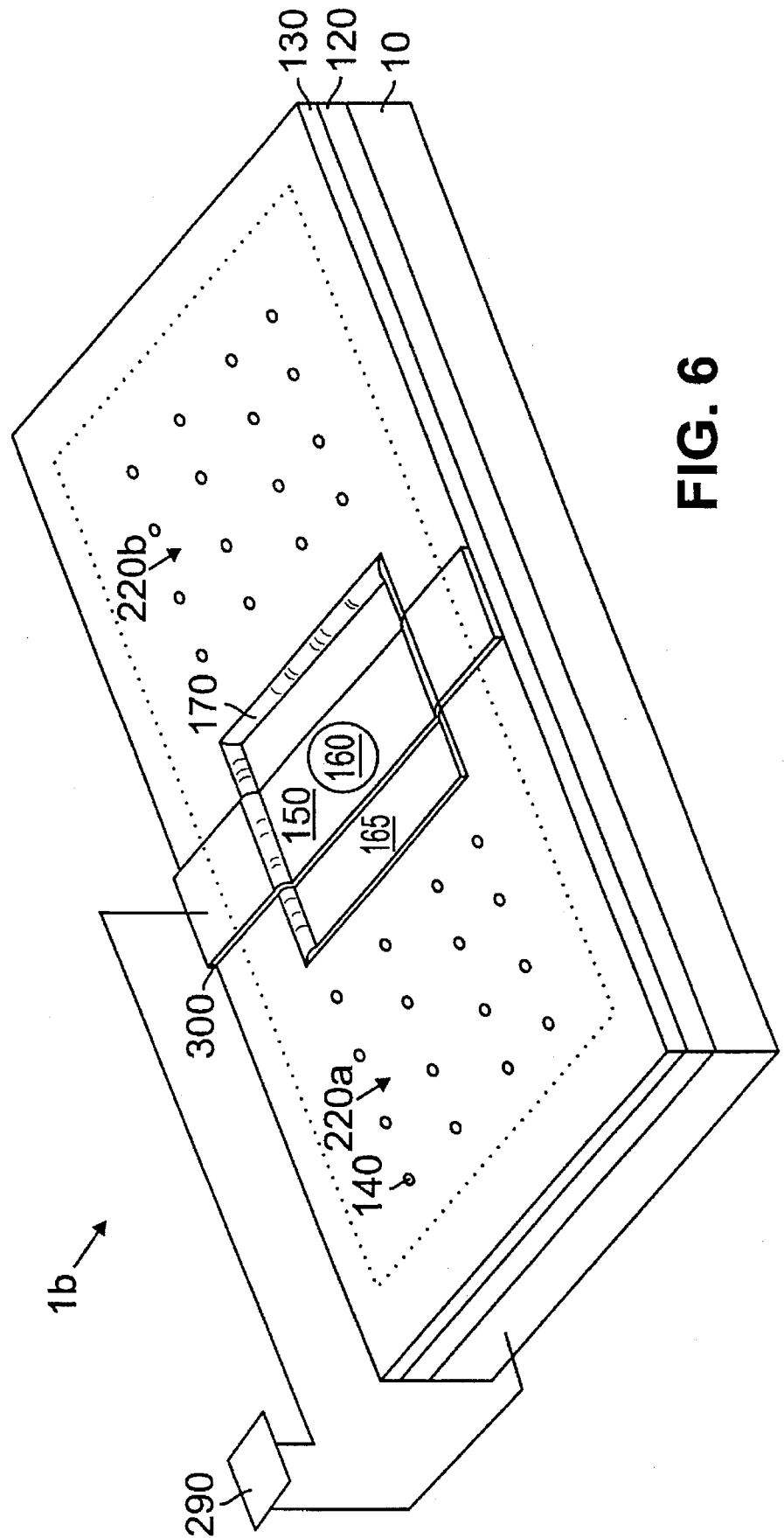
FIG. 6 is a perspective view of an embodiment of a micromechanical modulator incorporating two clamped-plate transmission lines according to the present invention.

FIG. 5 is an illustration of a "clamped plate" transmission line 110. Like the strip line transmission line 1, the clamped plate transmission line can receive energy from a moving mass, such as a modulator membrane, and radiate such energy, shown as a pulse 200, to the surrounding medium. FIG. 6 shows two clamped-plate transmission lines 220a and 220b incorporated in a micromechanical modulator 1b. The modulator 1b also includes an optical-signal-receiving membrane 150 and a substrate 10. The membrane 150 is supported above the substrate 10 by a support layer 120. A gap 20 exists between the membrane 150 and the substrate 10.

A plurality of holes 140 are located in each of the transmission lines 220a and 220b. The holes 140 are required since the transmission lines and the membrane would otherwise form a continuous layer that overlaps the support layer 120 creating and sealing a transmission line cavity 230 and modulator cavity 240. In the absence of the holes 140, such sealed cavities would render the gas contained therein ineffective for dissipating the kinetic energy of the membrane 150. Thus, in the modulator 1b, each transmission line 220a and 220b, in conjunction with the plurality of holes 140, provide the requisite damping for the membrane 150.

Maximum damping is achieved when the distance, d, between the holes 140 is given by:

$$d = 2[(Pg^2)/(12\pi\mu_{eff})]^{0.5} \quad [20]$$

where: P is the pressure of the gas through which the transmission line moves, g is the distance between the transmission line and the substrate, f is the natural resonant frequency of the transmission line and $\mu_{eff}$ is the effective gas viscosity, as previously defined.

The diameter of the holes 140 should be in the range of about 2 to about 4 times the gap between the transmission line, such as transmission lines 220a and 220b, and the substrate 10, and no more than about one-third of d, the hole spacing.

Expression [20] provides the hole spacing for maximum membrane damping, which minimizes the length of the transmission line.

The modulator 1b has a centrally-located rectangularly-shaped region 165, defined by a perimeter 170. The optical-signal-receiving membrane 150 is located in the region 165. As previously described for the modulator 1a, a layer 300 of conductive material may be deposited on the membrane 150 as required so that it is suitably conductive. The layer 300 may extend beyond the perimeter 170 of the region 165 for connection to a controlled voltage source 290. The controlled voltage source 290 is also connected to the substrate 10.

Figure 7:
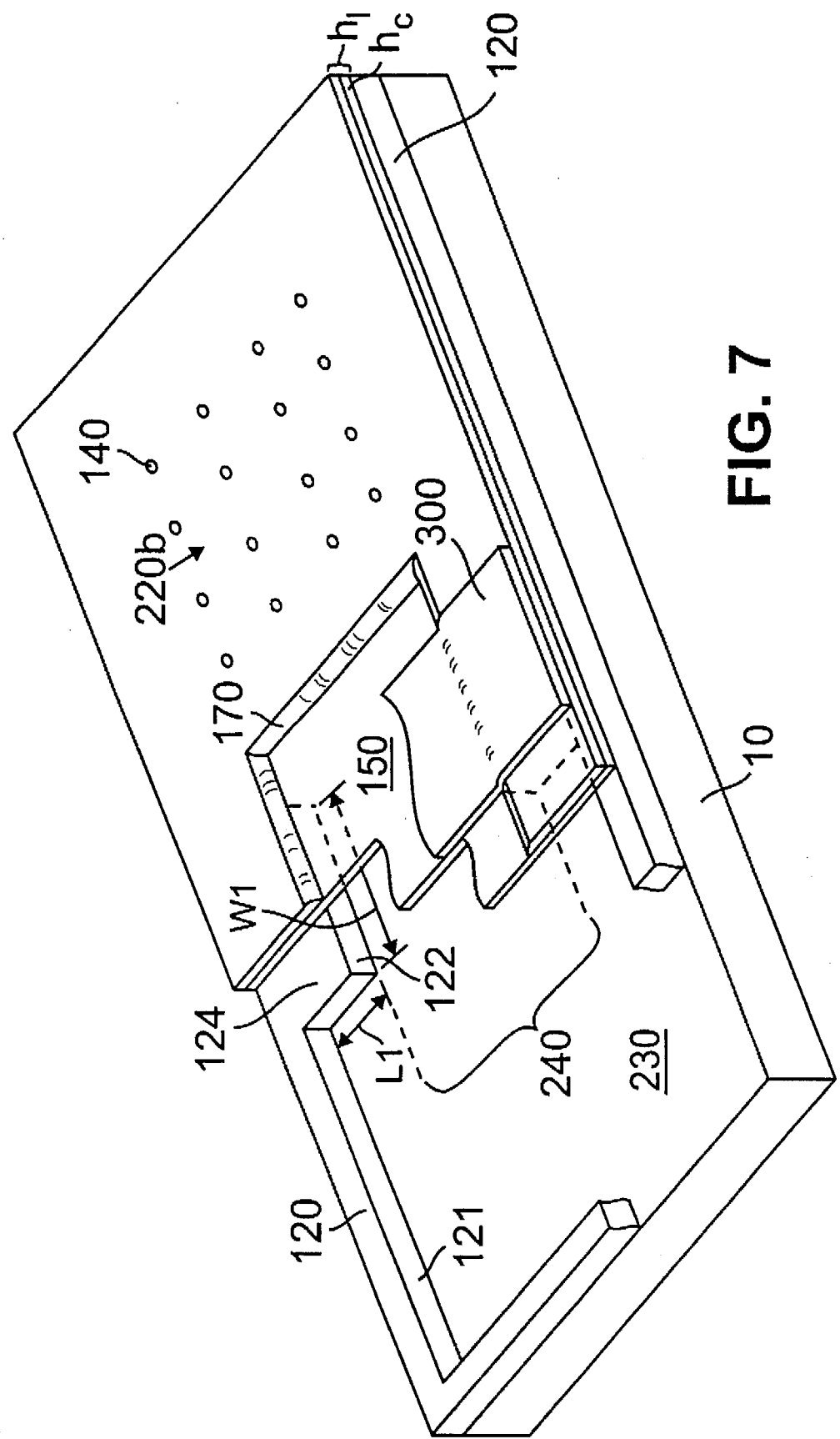
FIG. 7 is a perspective cutaway-view of the modulator of FIG. 6.

Preferred embodiments of a modulator incorporating a clamped-plate transmission line, such as the modulator 1b, include several unusual features in the upper surface and underlying support structure, as depicted in FIGS. 6 and 7.

In particular, it has been found that by reducing the mass per unit area of a central region in which the membrane 150 is located, such as the region 165, the rate at which energy is radiated away from the membrane is increased. In particular, the mass per unit area, $\rho_c$, of the region 165 should be no more than about one-half of the mass per unit area, $\rho_t$, of the transmission lines 220a and 220b. Preferably, $\rho_c=0.5\rho_t$. Preferably, the material used to form the region 165, including the membrane 150, is the same as that used to form the transmissions lines 220a and 220b. In such a case, the thickness, $h_c$, of the region 165, which includes the optical-signal-receiving membrane 15, is therefore preferably one-half of the thickness, $h_1$, of the transmission lines 220a and 220b. Such a change in thickness may be accomplished by etching away one-half of the thickness of a layer 130 deposited on the support layer 120 inside the perimeter 170. Alternatively, two layers of material may be sequentially deposited, wherein, after the deposition of the first layer, the region within the perimeter 170 is masked so that the second layer is not deposited in the region 165. A presently preferred material for use as the region 165, the membrane 150 and the transmission lines 220a and 220b is silicon nitride. Other materials suitable for forming the membrane 150, and hence the region 165 and the transmission lines are described in the above-referenced specifications.

Figure 8:
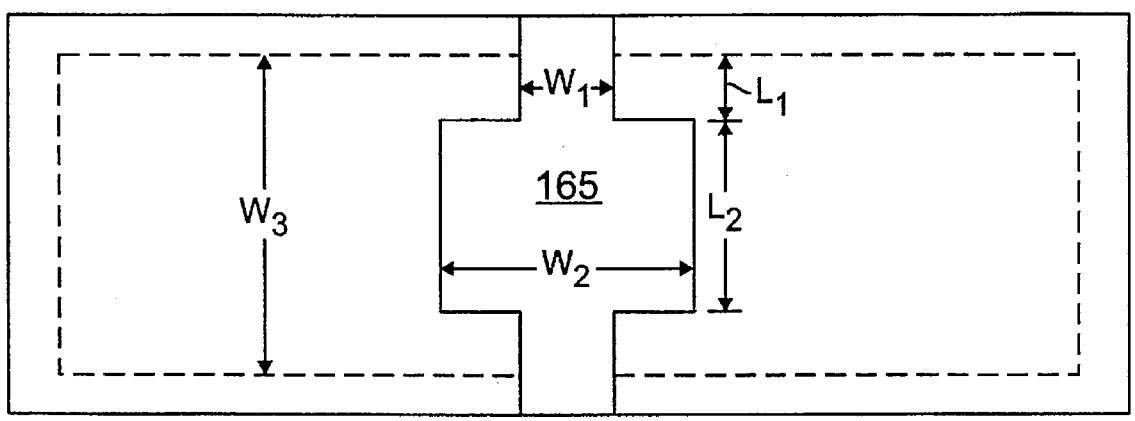
FIG. 8 is a simplified top view of the modulator of FIG. 6.

As depicted in FIG. 8, the width of the membrane 150 is designated $W_1$, the width of the region 165 is designated $W_2$, and the width of the transmission lines 220a and 220b is designated $W_3$. The length of the membrane is designated $L_2$. The length, $L_2$, is determined as a function of the desired operating frequency of the modulator 1b.

The length, $L_2$, may be estimated from the expression:

$$f=[0.766/L_2][S/\rho]^{0.5} \quad [21]$$

where: S is the stress in the membrane, $\rho$ is the average density of the membrane and f is the resonant frequency of the membrane. In calculating the stress, S, and density, $\rho$, of the membrane 150, the presence of the conductive layer 300 should be taken into account. Expression [21] is more properly used to calculate the diameter of a circular membrane, where $L_2$ is membrane diameter. It will, however, provide a "ball-park" estimate for a rectangularly-shaped membrane. Once an approximation of $L_2$ is known, a variety of modulators having different values for $L_2$ can be fabricated and tested. $L_2$ is then measured for the modulator having the target operating frequency. Alternatively, an estimate of $L_2$ can be obtained from the propagation velocity, v, which is given by expression [4], above. In this case, however, the parameters m and cr appearing in [4] refer to the membrane, not the transmission line. The frequency, f, is the round trip time for a pulse propagating through the membrane: $f=v/(2L_2)$. Having determined $L_2$, other dimensions of the modulator 1b will be given as a function of $L_2$.

The width, $W_1$, of the membrane 150 is preferably no greater than about one-fifth of the length, $L_2$, of the membrane. If the width of the membrane 150 exceeds $\frac{1}{5}L_2$, the overshoot of the membrane, i.e., movement of the membrane beyond its desired position, may become excessive. Preferably, overshoot is limited to no more than about twenty percent, which will be accomplished by limiting $W_1$ to no more than about twenty percent of the length, $L_2$, of the membrane 150.

The width, $W_2$, of the region 165 is preferably within about plus or minus twenty percent of $\frac{2}{5}$ of the length, $L_2$, of the membrane 150. In other words, preferably, $0.32 L_2 \leq W_2 \leq 0.48L_2$. Preferably, the width, $W_3$, of the transmission lines, such as the transmission lines 220a and 220b, is at least 2 times the length, $L_2$, of the membrane. In a presently preferred embodiment, $W_3$ is at least three times the length, $L_2$, of the membrane.

The membrane 150 overlaps the support layer 120 at a region 124. As described above, the width, $W_3$, of the transmission lines is greater than the length, $L_2$, of the membrane. As such, the region 124 of the support layer 120 extends inwardly relative to the portion of the support layer 120 that supports the transmission lines 220a and 220b, forming the modulator cavity 240. Thus, from the perspective of the membrane 150, the inner surface 121 of the portion of the support layer 120 that supports the transmission lines 220a and 220b is recessed relative to the inner surface 122 of the region 124. Such an arrangement results in an increase in the rate at which energy is radiated along the transmission lines away from the membrane 150. Having determined the value of $L_2$ and $W_3$, the length, $L_1$, of the region 124 is determined from the following expression: $W_3=2L_1+L_2$.

A clamped-plate modulator according to the present invention, such as the modulator 1b, may be fabricated according to the methods described in Ser. No. 08/565,453 (Docket No.: Arney 2-1-27-5, "Method and Apparatus for an Improved Micromechanical Modulator"). It will be appreciated that minor modification of the methods described in the foregoing application are required in view of the reduced-mass central region, such as region 165. Such modification is within the abilities of those skilled in the art.

It should be understood that the embodiments described herein are illustrative of the principles of this invention and that various modifications may occur to, and be implemented by, those skilled in the art without departing form the scope and spirit of the invention. For example, the mechanical transmission lines may be used with other types of micromechanical modulators than those described herein to damp membrane vibration. Further, the transmission lines may have other configurations than those described herein. Additionally, while the embodiments described herein incorporated two strip-line and two clamped plate transmission lines, more or less than the two transmission lines may be used in conjunction with other modulators. Furthermore, while in the specific embodiments described herein the transmission lines and the membrane are shown to be seamlessly integrated, they may be configured in other ways in other embodiments. For example, in some embodiments, an intermediate mechanical connection may be placed between the membrane and the transmission lines. In other embodiments, the transmission lines may overlap or underlie the membrane.

I claim:

1. A micromechanical modulator operable at an operating frequency to modulate an optical signal, the modulator having two spaced layers, one of the layers being movable, wherein the movable layer has a first position relative to the other layer in the absence of a bias signal and a second position in the presence of a bias signal, wherein the change in position of the movable layer in response to the bias signal remits in a change in a measurable characteristic of the optical signal returned from the modulator, the modulator further comprising at least one transmission line mechanically communicating with the movable layer, wherein the transmission line is physically adapted to receive and dissipate an amount of energy from the movable layer sufficient to prevent the movable layer from vibrating after moving from the first position to the second position or from the second position to the first position.

2. The modulator of claim 1 comprising a second transmission line mechanically communicating with the movable layer.

3. The modulator of claim 1 wherein a quality factor of the modulator is in the range of about 0.5 to about 1.0.

4. The modulator of claim 1 wherein a quality factor of the modulator is in the range of about 0.7 to about 0.8.

5. The modulator of claim 1 wherein ninety-five percent of the amount of energy received by the transmission line from the movable layer is dissipated.

6. The modulator of claim 1 wherein ninety-nine percent of the amount of energy received by the transmission line from the movable layer is dissipated.

7. The modulator of claim 1 wherein the amount of energy received and dissipated by the transmission line is removed in one-quarter cycle or less at the modulator's operating frequency.

8. The modulator of claim 1 wherein the movable layer is characterized by a width and a length, and wherein the transmission line is a strip-line transmission line characterized by a width and a length.

9. The modulator of claim 8 further comprising support arms for supporting the transmission line.

10. The modulator of claim 8 wherein the width of the transmission line is equal to the width of the moveable layer.

11. The modulator of claim 8 wherein the length of the transmission line is at least three times the length of the movable layer.

12. The modulator of claim 1 wherein the transmission line is a clamped-plate transmission line characterized by a width.

13. The modulator of claim 12 further comprising structural adaptations for allowing gas contained in cavities formed beneath the transmission line and movable layer to escape.

14. The modulator of claim 13 wherein the structural adaptations comprise a plurality of spaced holes formed in the transmission line.

15. The modulator of claim 14 wherein the spacing, d, of the holes is determined according to the expression $d=2[(Pg^2)/(12 \pi \mu_{eff} f)]^{0.5}$, where P is the pressure of the gas contained in the cavities, g is the distance between the transmission line and the other layer, f is the natural resonant frequency of the transmission line and $\mu_{eff}$ is effective gas viscosity, which is determined according to the expression $\mu_{eff}=\mu/\{1+[6(2-\sigma)\lambda/(\sigma g)]\}$, where $\sigma$ is the accommodation coefficient and $\lambda$ is the mean-free-path of the gas.

16. The modulator of claim 12 further comprising a central region in which the movable layer is situated, the central region having a mass per unit area that is no more than about one-half of the mass per unit area of the transmission line.

17. The modulator of claim 16 wherein the movable layer is further characterized by a width and a length, and wherein the width of the movable layer is no more than about one-fifth of the length of the movable layer.

18. The modulator of claim 16 wherein the central region is further characterized by a width, and wherein the width of the central region is at least about 32 percent, and no more than about 48 percent, of the length of the movable layer.

19. The modulator of claim 16 wherein the width of the transmission line is at least twice the length of the movable layer.

20. A micromechanical modulator for modulating an optical signal, comprising:

a substrate;

a vertically-movable membrane that receives an optical signal, wherein the membrane is supported in a spaced and superposed relation to the substrate defining an air gap;

a transmission line in mechanical communication with the membrane; and a device for supplying a bias signal to the membrane and substrate; wherein, in the absence of the bias signal, the membrane has a first vertical position relative to the substrate and in the presence of the bias signal the membrane has a second vertical position relative to the substrate, wherein, there is a difference in an optical property of the modulator when the membrane is in its first vertical position as compared to its second vertical position, and further wherein the transmission line receives and dissipates a sufficient amount of the energy developed in the membrane as the membrane changes vertical position so that there is substantially no vibration in the membrane.

21. The modulator of claim 20 further comprising a second transmission line, and further wherein both transmission lines are strip-line transmission lines.

22. The modulator of claim 20 further comprising a second transmission line, and further wherein both transmission lines are clamped-plate transmission lines.

* * * * *